United States Patent
Wang et al.

(10) Patent No.: US 9,232,767 B2
(45) Date of Patent: Jan. 12, 2016

(54) ANIMAL LITTER, PROCESS FOR PREPARING ANIMAL LITTER AND METHOD OF REMOVAL OF ANIMAL WASTE

(71) Applicant: Kent Pet Group, Inc., Muscatine, IA (US)

(72) Inventors: Lin Wang, Iowa City, IA (US); Thomas A. Wiesner, Muscatine, IA (US)

(73) Assignee: Kent Pet Group, Inc., Muscatine, IA (US)

( * ) Notice: Subject to any disclaimer, the term of this patent is extended or adjusted under 35 U.S.C. 154(b) by 0 days.

(21) Appl. No.: 13/772,029

(22) Filed: Feb. 20, 2013

(65) Prior Publication Data

US 2013/0213312 A1 Aug. 22, 2013

Related U.S. Application Data

(60) Provisional application No. 61/600,971, filed on Feb. 20, 2012.

(51) Int. Cl.
*A01K 29/00* (2006.01)
*A01K 1/015* (2006.01)

(52) U.S. Cl.
CPC .................................. *A01K 1/0155* (2013.01)

(58) Field of Classification Search
USPC .......................... 119/171, 172, 173; 424/76.6
See application file for complete search history.

(56) References Cited

U.S. PATENT DOCUMENTS

| | | |
|---|---|---|
| 3,059,615 A | 10/1962 | Kuceski et al. |
| 3,124,459 A | 3/1964 | Erwin |
| 3,747,564 A | 7/1973 | Bickoff et al. |
| 3,747,584 A | 7/1973 | Kikuchi |
| 3,789,797 A | 2/1974 | Brewer |
| 3,802,089 A | 4/1974 | Stephanoff |
| 3,921,581 A | 11/1975 | Brewer |
| 3,923,005 A | 12/1975 | Fry et al. |
| 4,007,708 A | 2/1977 | Yacono |
| 4,009,684 A | 3/1977 | Kliment et al. |
| 4,020,156 A | 4/1977 | Murray et al. |
| 4,107,119 A | 8/1978 | Kameyama et al. |
| 4,157,696 A | 6/1979 | Carlberg |
| 4,159,008 A | 6/1979 | Bavaveas |
| 4,206,718 A | 6/1980 | Brewer |
| 4,258,660 A | 3/1981 | Pris et al. |
| 4,261,849 A | 4/1981 | Benjaminson |
| 4,296,234 A | 10/1981 | Mindt et al. |
| 4,311,115 A | 1/1982 | Litzinger |
| 4,315,761 A | 2/1982 | Larrson |
| 4,355,593 A | 10/1982 | Stapley |
| 4,374,794 A | 2/1983 | Kok |
| 4,386,580 A | 6/1983 | Johnson |
| 4,407,231 A | 10/1983 | Colborn et al. |
| 4,424,763 A | 1/1984 | Johnson |
| 4,425,321 A | 1/1984 | Jacquet et al. |
| 4,465,019 A | 8/1984 | Johnson |
| 4,519,340 A | 5/1985 | Dickey |
| 4,534,891 A | 8/1985 | Boden et al. |
| 4,560,527 A | 12/1985 | Harke et al. |
| 4,607,594 A | 8/1986 | Thacker |
| 4,638,763 A | 1/1987 | Greenberg |
| 4,676,196 A | 6/1987 | Lojek et al. |
| 4,685,420 A | 8/1987 | Stuart |
| 4,727,824 A | 3/1988 | Ducharme et al. |
| 4,770,878 A | 9/1988 | Thomas |
| 4,794,022 A | 12/1988 | Johnson et al. |
| 4,844,010 A | 7/1989 | Ducharme et al. |
| 4,883,021 A | 11/1989 | Ducharme et al. |
| 4,963,366 A | 10/1990 | Thomas |
| 5,000,115 A | 3/1991 | Hughes |
| 5,001,115 A | 3/1991 | Sloan |
| 5,014,650 A | 5/1991 | Sowle et al. |
| 5,016,568 A | 5/1991 | Stanislowski et al. |
| 5,062,954 A | 11/1991 | Leedy et al. |
| 5,085,175 A | 2/1992 | Clements, Jr. et al. |
| 5,094,189 A | 3/1992 | Aylen et al. |
| 5,101,771 A | 4/1992 | Goss |
| 5,152,250 A | 10/1992 | Loeb |
| 5,154,594 A | 10/1992 | Gamlen |
| 5,176,107 A | 1/1993 | Buschur |
| 5,183,010 A | 2/1993 | Raymond et al. |
| 5,188,064 A | 2/1993 | House |
| 5,193,489 A | 3/1993 | Hardin |

(Continued)

FOREIGN PATENT DOCUMENTS

| | | |
|---|---|---|
| CA | 2290610 | 10/1998 |
| CA | 2280846 | 6/1999 |

(Continued)

OTHER PUBLICATIONS

Chapter 4 African Oil Palm, http://www.fao.org/docrep/003/w3647e/W3647E04.htm [retrieved from internet Oct. 16, 2008] Jun. 28, 2003, 13 pages.

PCT International Search Report and Written Opinion dated Jul. 9, 2008—(PCT/US2007/070212).

International Search Report dated Sep. 22, 2008—(PCT/US2008/057223).

International Search Report in International Application No. PCT/US98/25262, dated Mar. 29, 1999.

(Continued)

*Primary Examiner* — Trinh Nguyen

(74) *Attorney, Agent, or Firm* — Fitch, Even, Tabin & Flannery LLP

(57) ABSTRACT

An animal litter, process for preparing the animal litter and a method for removal of animal waste using the animal litter are provided. The animal litter generally includes corn cob, a lubricant, and a cohesiveness agent. The animal litter is in the form of discrete plural particles which tend to agglomerate when wetted.

12 Claims, No Drawings

(56) References Cited

U.S. PATENT DOCUMENTS

| | | |
|---|---|---|
| 5,207,389 A | 5/1993 | Hall et al. |
| 5,207,830 A | 5/1993 | Cowan et al. |
| 5,209,185 A | 5/1993 | Chikazawa |
| 5,215,041 A | 6/1993 | Krahenbuhl |
| 5,216,980 A | 6/1993 | Kiebke |
| 5,230,305 A | 7/1993 | House |
| 5,329,880 A | 7/1994 | Pattengill et al. |
| 5,339,769 A | 8/1994 | Toth et al. |
| 5,352,780 A | 10/1994 | Webb et al. |
| 5,358,607 A | 10/1994 | Ellis |
| 5,361,719 A | 11/1994 | Kiebke |
| 5,415,131 A | 5/1995 | Dodman |
| 5,452,684 A | 9/1995 | Elazier-Davis et al. |
| 5,458,091 A | 10/1995 | Pattengill et al. |
| 5,469,809 A | 11/1995 | Coleman |
| 5,503,111 A | 4/1996 | Hughes |
| 5,526,770 A | 6/1996 | Kiebke |
| 5,526,771 A | 6/1996 | Ito |
| 5,542,374 A | 8/1996 | Palmer, Jr. |
| 5,605,114 A | 2/1997 | Peltenburg et al. |
| 5,609,123 A | 3/1997 | Luke et al. |
| 5,662,067 A | 9/1997 | Stubbs et al. |
| 5,664,523 A | 9/1997 | Ochi et al. |
| 5,690,052 A | 11/1997 | Sladek |
| 5,740,761 A | 4/1998 | Lee et al. |
| 5,762,023 A | 6/1998 | Carter |
| 5,806,462 A | 9/1998 | Parr |
| 5,878,696 A | 3/1999 | Gerling et al. |
| 5,927,049 A | 7/1999 | Simard |
| 5,970,916 A | 10/1999 | Yoder et al. |
| 6,053,125 A | 4/2000 | Kory et al. |
| 6,089,189 A | 7/2000 | Goss et al. |
| 6,089,190 A | 7/2000 | Jaffee et al. |
| 6,098,569 A | 8/2000 | Kent et al. |
| 6,147,037 A | 11/2000 | Gardlik et al. |
| 6,187,581 B1 | 2/2001 | Sicotte et al. |
| 6,216,634 B1 | 4/2001 | Kent et al. |
| 6,287,550 B1 | 9/2001 | Trinh et al. |
| 6,371,049 B1 | 4/2002 | Boden et al. |
| 6,405,677 B2 | 6/2002 | McPherson et al. |
| 6,568,349 B1 | 5/2003 | Hughes et al. |
| 6,622,658 B2 | 9/2003 | McPherson et al. |
| 6,803,033 B2 | 10/2004 | McGee et al. |
| 6,817,315 B1 | 11/2004 | Tsengas et al. |
| 6,863,027 B1 | 3/2005 | Silva |
| 6,868,802 B2 | 3/2005 | McPherson et al. |
| 7,124,710 B2 | 10/2006 | Weaver |
| 7,294,343 B2 | 11/2007 | Barresi et al. |
| 7,331,309 B2 | 2/2008 | Burckbuchler, Jr. |
| 7,527,019 B2 | 5/2009 | Burckbuchler, Jr. |
| 7,637,229 B2 | 12/2009 | Hurwitz et al. |
| 7,753,002 B2 | 7/2010 | Wang et al. |
| 7,757,638 B2 | 7/2010 | Wang et al. |
| 7,793,616 B2 | 9/2010 | Ikegami |
| 7,856,946 B2 | 12/2010 | Burckbuchler, Jr. |
| 8,074,604 B2 | 12/2011 | Swank |
| 2002/0028283 A1 | 3/2002 | Freeman |
| 2002/0134315 A1 | 9/2002 | Boden et al. |
| 2002/0134316 A1 | 9/2002 | McPherson |
| 2003/0113430 A1 | 6/2003 | Ethington, Jr. |
| 2003/0131799 A1 | 7/2003 | Wong et al. |
| 2003/0205204 A1 | 11/2003 | Wang et al. |
| 2003/0220211 A1 | 11/2003 | Stoddart et al. |
| 2004/0069237 A1 | 4/2004 | McPherson et al. |
| 2004/0124139 A1 | 7/2004 | Talbot et al. |
| 2006/0201438 A1 | 9/2006 | Anttila et al. |
| 2007/0017453 A1 | 1/2007 | Fritter et al. |
| 2007/0101941 A1 | 5/2007 | Wang et al. |
| 2007/0277739 A1 | 12/2007 | Wang et al. |
| 2007/0289543 A1 | 12/2007 | Petska et al. |
| 2008/0121187 A1 | 5/2008 | McPherson |
| 2008/0171297 A1 | 7/2008 | Reynolds et al. |
| 2008/0223302 A1 | 9/2008 | Wang et al. |
| 2012/0288468 A1 | 11/2012 | Wang et al. |

FOREIGN PATENT DOCUMENTS

| | | |
|---|---|---|
| CA | 2429534 | 5/2002 |
| CA | 2653395 | 10/2011 |
| EP | 0788736 A1 | 7/1995 |
| EP | 2311313 | 11/2002 |
| EP | 1466522 | 10/2004 |
| EP | 2023714 | 1/2007 |
| JP | 60094042 | 5/1985 |
| JP | 10-271931 | 10/1998 |
| JP | 2004-121264 | 4/2004 |
| WO | 99/30556 | 6/1999 |
| WO | 01/97604 A1 | 12/2001 |
| WO | 0197604 | 12/2001 |
| WO | 03088739 | 10/2003 |
| WO | 2007/146623 | 12/2007 |
| WO | 2008/113071 | 9/2008 |

OTHER PUBLICATIONS

International Search Report and the Written Opinion of the International Searching Authority in International Application No. PCT/US2010/025253, Jun. 15, 2012, 13 pages.

International Search Report for PCT/US02/37131, dated Apr. 13, 2004.

European Search Report for EP 10184455, mailed Mar. 4, 2011.

Ranasinghe T.K.G. 1999, Chapter IV, Part 16—Coconut Processing in: Modern Coconut Management; Palm Cultivation and Products, edited by Ohler J. G., FAO and Intermediate Technology Publications, Ltd.

International Search Report and Written Opinion for PCT/US2013/026950, dated Apr. 12, 2013.

ANIMAL LITTER, PROCESS FOR PREPARING ANIMAL LITTER AND METHOD OF REMOVAL OF ANIMAL WASTE

RELATED APPLICATION

This application claims the benefit of prior provisional application Ser. No. 61/600,971. The entire contents of the foregoing provisional application are hereby incorporated by reference in their entireties. Also incorporated in their entireties are the disclosures of prior provisional application Ser. Nos. 61/600,966; 61/600,976; and 61/600,978.

FIELD

The present application relates to an animal litter, and more particularly to a litter that includes ground corn cob. The application further pertains to a process for preparing an animal litter, methods for removal of animal waste, and related products, processes, and methods.

BACKGROUND

Clumping animal litters are typically provided in the form of discrete plural particles. The particles tend to agglomerate into solid masses or clumps when wetted by a liquid waste such as animal urine. A number of such clumping litters are known. One advantage of such clumping litters is that the solid clumps, which are formed upon wetting of the litter, can be separately removed as discrete entities from the remaining litter. The clumped litter can be discarded by the animal owner, leaving behind a quantity of relatively uncontaminated litter for future use. Animal owners, particularly owners of house cats, often find the clumping property of such litters to be convenient for periodic cleaning of the animal litter box. Ammonia-masking properties also are desirable in animal litters because ammonia, a breakdown product of the urea found in animal urine, is a significant factor that contributes to the undesirable odor of animal waste. Some known animal litters have good ammonia-masking properties.

Many clumping animal litters are made from clays and other mineral substrates. Such litters typically include particles of a mineral substrate, which substrate functions as an absorbent and/or odor reducer. The particles may be coated with a liquid-activated adhesive material, such as gelatinized starch, on the surfaces of the particles. When wetted, the adhesive material is activated and causes the discrete litter particles to agglomerate into clumps.

Although clay-based litters may be functional as clumping animal litters, such litters may have different features and characteristics compared to other materials. For example, one feature of clay litters is the high density of the clay component of the litter. Because of this high density, a relatively heavy mass of litter must be used for a given volume of urine. In addition, the resulting clumps of soiled litter are somewhat heavy, and thus can fracture in the absence of strong particle adhesion. Another feature of clay litters is that, because the clay is not biodegradable, the litter cannot be flushed into some sewage systems after use. This may be inconvenient for certain animal owners.

In recognition of these features, animal litters made from biodegradable materials, such as seed hulls or other grain-based materials, have been provided. Such litters are often suitable for disposal by flushing into sewage systems. For instance, U.S. Pat. No. 6,014,947 purports to disclose a grain-based litter made from whole wheat or other ground grains. In recognition of the features inherent in clumping animal litters, biodegradable litters that exhibit a clumping property have undergone development. Like typical clumping clay litters, such litters often comprise discrete particles of a liquid-absorbent substrate having a liquid-activated adhesive coated thereon.

Numerous litters are disclosed in U.S. Pat. Nos. 7,757,638; 7,753,002; 6,868,802; 6,622,658; 6,405,677; 6,216,634; and 6,098,569, as well as U.S. application Ser. No. 13/103,778, all assigned to Grain Processing Corporation of Muscatine, Iowa. These patents provide excellent teachings as to organic, biodegradable litters that, in preferred embodiments, are based exclusively on natural materials. The litters disclosed in these patents have excellent ammonia absorbing properties.

The present application seeks to provide an animal litter that differs from the heretofore described litters.

SUMMARY

An animal litter, process for preparing the animal litter and a method for removal of animal waste using the animal litter are provided. The animal litter generally includes corn cob and other ingredients.

In many embodiments, no more than about 5% of the corn cob particles used to prepare the litter are larger than U.S. standard #30 mesh screen size while at least 50% of the corn cob particles are smaller than U.S. standard #40 mesh screen size and at least 20% of the particles are smaller than U.S. standard #80 mesh screen size.

In many embodiments, not mutually exclusive with respect to the heretofore described embodiments, the litter includes at least about 35 weight corn cob, a lubricant, and a cohesiveness agent. The animal litter is in the form of discrete plural particles which tend to agglomerate when wetted.

Further, in some embodiments a process for preparing an animal litter is also provided. The process includes the steps of providing a mixture of at least a first sorbent comprising ground corn, a lubricant, and a cohesiveness agent; and compacting the mixture of into discrete plural compacted particles which tend to agglomerate when wetted. The ground corn may be present in an amount of at least 35% and may have the particle size distribution heretofore described. The litter may include additional sorbents, such as wood fibers, malt sprouts, or corn germ.

Additionally, a method for removal of animal waste is provided in some embodiments. The method includes the steps of providing a container that includes an animal litter, allowing an animal to excrete waste into said litter, whereby liquid present in said container as a result of said waste causes at least a portion of said litter to agglomerate into at least one clump, and removing the clump from the container. The animal litter includes a first sorbent that comprises ground corn, in many cases at least about 35% ground corn, a lubricant, and a starch cohesiveness agent. The corn may have the particle size distribution heretofore described. The animal litter is in the form of discrete plural compacted particles which tend to agglomerate when wetted. Further, the cohesiveness agent is present in said litter in an amount effective to enhance the intraparticle cohesion of said particles.

These and other aspects may be understood more readily from the following description.

DETAILED DESCRIPTION

The animal litters described herein may be formulated as dumping litters or as non-clumping litters but generally is provided in the form of a dumping litter. The litter preferably is formulated to take the form of pellets or other compacted forms, particularly when the litter is intended as a cat litter.

After the litter has become soiled, the liquid in the animal urine will cause some of the litter to form a dump. The soiled litter then may be removed from the box by removing the clump and any solid waste litter from remaining unsoiled litter and disposing of the soiled litter. Alternatively, the soiled litter may be removed without separating it from any unsoiled litter in the box, by disposing of all or substantially all of the litter in the box. In either case, animal waste will be thereby removed. Optionally, the supply of litter may be replenished with fresh litter.

A range of desired properties for clumping animal litter has been identified. These properties include biodegradability, high sorption capacity, cohesion, clumpablility, ammonia and other odor masking, a density and texture that is acceptable for the target animal, clump strength, tendency to remain clumped, clump weight, and cost. In general, the various ingredients and processing conditions may be selected to accommodate a desired combination of properties. Some combinations of ingredients and processing conditions may not yield a litter that is commercially satisfactory. Selection of appropriate ingredients and processing conditions will become apparent upon review of the following description.

In one embodiment, the animal litter is in the form of discrete plural particles, which particles generally are sufficiently cohesive for use as an animal litter. By "particles" it is contemplated granules or pellets obtained by compaction. The compaction may be any process suitable for compressing the ingredients from which the litter is composed to an extent that the internal cohesion of the ingredients is increased. Generally, the mass of ingredients should become sufficiently internally cohesive for use as an animal litter. The preferred method of compaction is by pelletizing the mixtures of ingredients in a pellet mill, but other processes (such as extrusion) may be employed. Generally, the pellets formed in a pellet mill (or the extrudate formed upon extruding the litter components) should be subjected to a process such as crumbling, to reduce the size of the pellets (or extrudate).

The animal litter generally includes ground corn cob in combination with other materials. Corn cob is believed to function as a sorbent for animal urine, and to contribute favorably to the clumping properties of the litter. To enable clumping, the ground corn cob should be provides as a finely ground material. In this regard, the corn cob material may be finely ground such that it passes through a 1/16 inch screen, such as found in a hammer mill. Other forms and particle sizes of corn cob material may also be included in the animal litter. For example, corn cob material may be ground to have a larger and/or smaller particle size and may also be included in a combination of particle sizes. In many embodiments, no more than about 5% of the corn cob particles used to prepare the litter are larger than U.S. standard #30 mesh screen size while at least 50% of the corn cob particles are smaller than U.S. standard #40 mesh screen size and at least 20% of the particles are smaller than U.S. standard #80 mesh screen size. Although it is not intended to limit the invention to a particular theory of operation, it is believed that the particle size distribution heretofore described will yield particles with sufficiently small surface area to enhance absorption of liquid relative to particles of larger surface area while still allowing for ready processing in the manner discussed herein.

In some embodiments, the ground corn cob has the following screen profile:

| % over #8 | % over #14 | % over #20 | % over #30 | % over #40 | % over #80 | % Thru #80 | Total |
|---|---|---|---|---|---|---|---|
| 0.3 | 0.5 | 0.6 | 12.1 | 21.6 | 33.4 | 31 | 99.5 |

The corn cob material may be included in the litter in range of amounts. For example, in one form, the corn cob material is included such that it forms at least about 35% of the overall animal litter composition. The corn cob material may also be included in larger amounts, such as about 65% of the animal litter composition. In one form, the corn cob material is included in an amount of about 30% to about 85%.

The animal litter may include one or more lubricants including fats, oils and mixtures thereof. The lubricant is not necessarily believed to provide desired properties itself to the litter, but is believed to be useful in connection with the preparation of the litter. The lubricant can be present in any amount sufficient to facilitate the compaction of the animal litter composition into particles, as described herein. For example, in one form, the animal litter includes ground virgin corn germ. Virgin germ contains oils and used as a lubricant. The germ may be included in any suitable amount. A typical range of amounts will be from about 1% to about 10% by weight.

Other suitable lubricants include, for example, fats and oils. Exemplary fats include lauric fats, such as babassu, coconut and palm kernel, and animal fats, such as butter oil, chicken fat, lard and beef tallow. Exemplary oils include fish oils, such as menhaden, and vegetable oils. Preferred vegetable oils include, for example, canola, cocoa butter, corn, cottonseed, olive, palm, peanut, rapeseed, soybean and sesame. Preferably, the lubricant is a vegetable oil because animals are often attracted to animal fats and fish oils as a food source. When used, such lubricant may be effect, may be used in any suitable amount, such as 1-10% by the weight.

The animal litter also includes at least one cohesiveness agent which is employed to effect intraparticle cohesion. Prior art litters employ modified, pre-gelatinized starches to effect adhesion between particles of litter, i.e., interparticle adhesion. When a polysaccharide cohesiveness agent is employed, the cohesiveness agent is believed to provide additional hydroxyl groups, which enhance the bonding between grain proteins within the litter granule. It is further believed that the additional hydroxyl groups so function by enhancing the hydrogen bonding of proteins to starch and to other proteins. The cohesiveness agent may be present in any amount suitable to enhance the cohesiveness of the granules of animal litter.

The cohesiveness agent preferably is a polysaccharide. Any suitable polysaccharide may be used in conjunction with the invention and thus, for example, the cohesiveness agent may comprise one or more polysaccharides such as dextrins, maltodextrins, starches, flours, cellulosics, hemicellulosics, and the like. Preferably, the cohesiveness agent comprises a starch, and most preferably, the cohesiveness agent comprises a corn starch. It has been found that non-gelatinized, unmodified starches are especially suitable for use as cohesiveness agents in conjunction with the invention. When unmodified starches are employed, it is believed that such starches may contribute to a small extent to interparticle adhesion in the clumped litter.

The cohesiveness agent may further include a fibrous material. Fibers for use as a cohesiveness agent include soluble and insoluble fibers such as apple fiber barley-bran flour, barley-flour, brewers spent grain, carrageenan gum, citrus fiber, citrus pulp sacs, cocoa, corn bran, corn fiber, dried cranberries, fig powder, guar gum, gum agar, gum Arabic, locust bean gum, oat bran, oat fiber, pea fiber, powdered cellulose, dried prunes, defatted rice bran, stabilized rice bran, rice fiber, sodium carboxymethylcellulose, soy fiber, sugar beet fiber, wheat bran, and detailed wheat germ. Other suitable fibers include, for example, cellulose, microcrystalline cellulose, resistant starch, chitin/chitosan methylcellulose, hydroxypropyl methylcellulose, carboxymethylcellulose, pectin, alginate, karaya tragacanth, gellan, arabinogalactan, inulin, konjac flour, psyllium seed husk, curdlan, and polydextrose. It is contemplated that some of these materials will function as sorbents in some embodiments. To the extent that a cohesiveness agent is indeed in the litter formation, the cohesiveness agent is an ingredient that is different from the "sorbent." in other words a litter that is said to include both a "sorbent" and a "cohesiveness agent" will have separate ingredients for the sorbent and the cohesiveness agent, even though the cohesiveness agent may have its own sorption properties and even thought the sorbent may contain plant fiber.

The cohesiveness agent may be included in a variety of amounts. For example, in one form, the cohesiveness agent is included in a range of about 5% to about 40%. Other cohesiveness agents and amounts of cohesiveness agents may be included as discussed in more detail below. The litter may include further includes a supplemental cohesiveness agent, which is an ionic species that is believed to enhance protein-protein and/or protein-starch interactions. Any suitable ionic salt may be used in conjunction with the invention. For example, the supplemental cohesiveness agent may be selected from among the alkali and alkaline-earth salts of common anions, such as the halide, nitrate, nitrite, carbonate, phosphate, sulfate, and bicarbonate salts, and the like. Exemplary supplemental cohesiveness agents include of sodium chloride, calcium chloride, sodium carbonate, calcium carbonate, sodium bicarbonate and mixtures thereof. The supplemental cohesiveness agent may be present in any amount sufficient to assist the cohesiveness agent in enhancing the cohesion of the animal litter granules.

Further, the animal litters may include ingredients such as whole ground grain, or grain meal. By "plant meal" it is meant to include meals or flours from grain, beans, grass, and the like, which are typically thought of as agriculturally derived meals or flours. Any plant meal that may be formulated into a clumping litter in accordance with the teachings herein may be deemed suitable for use. The plant meal preferably is a grain meal, i.e., a ground grain, and preferably is a ground whole grain. In some embodiments, ground fines can be removed from a whole grain meal, such as by screening. The remaining ground product is still deemed to be a whole grain meal within the meaning of the present application. Suitable plant meals include, for example, corn meal, soy meal, sorghum meal, alfalfa meal, barley meal, and the like. Combinations of two or more of the foregoing may be used. Preferably, the grain meal used in the animal litter includes a grain meal derived from an oil-rich grain. Most preferably, the grain meal is derived from corn grain.

For practical considerations, the grain meal preferably consists of a whole unprocessed grain meal, though a processed grain meal or a combination of a whole grain meal and a processed grain meal may also be used in the animal litter. By "whole grain meal" it is meant to include a milled whole grain, such as grain meal that is produced in a wet or dry milling process. Processed grain meal includes, for example, meal or flour from which the germ or bran has been removed. In one preferred embodiment, the grain meal used in the animal litter includes whole corn meal or a combination of whole corn meal and processed corn meal, such as defatted corn meal obtained from a solvent extraction or press extraction process.

In some embodiments, the litter includes a plant fiber that is effective in enhancing the agglomeration of the particles of litter when wetted. In one form, the fiber is present in at least an amount effective to enhance the agglomeration of the particles of animal litter when the particles are contacted with a liquid such as animal urine. Without being bound by any particular theory, it is contemplated that the fiber provides for an enhancement of clump strength, or an increase in dump cohesiveness, and in many embodiments, an increase in both clump strength and cohesiveness. The enhancement in particle agglomeration, with respect both to clump strength and cohesiveness, is believed to be due to enhancement of adhesion between the particles, which in some cases is believed to be due to hydrogen bonding phenomena. Clump strength is a measure of the force required to fracture a clump of animal litter, while cohesiveness is a measure of the friability of a clump. A high clump strength is advantageous in that it reduces the likelihood of breakage of the clumps, thereby allowing the soiled animal litter to be removed more effectively. High clump strength also minimizes the likelihood of leaving behind soiled animal litter that may break off upon removal of soiled clumps. Both clump strength and cohesiveness, but especially cohesiveness, may be qualitatively evaluated with the increase in these properties being evaluated relative to an animal litter that does not include the fiber.

Any suitable plant fiber or combination of fibers may be used. Exemplary plant fibers include grain bran and citrus residues. Preferred grain brans include, for example, wheat bran, corn bran, soy bran, sorghum bran, barley bran, or any combination thereof. Preferably, the grain bran includes a ground corn bran. In one form, the grain bran is preferably present in an amount of from about 1% to about 90%, more preferably from about 3% to about 70%, even more preferably from about 4% to about 50%, and most preferably from about 5% to about 30% by weight of the animal litter. These amounts are exclusive of any bran present in the grain meal, with the proviso that the invention is not intended to encompass ground whole grain to which nothing has been added. If the litter is embodied in a product that comprises one or both of grain meal or grain germ in combination with a grain bran, the grain bran being a bran from the same grain from which the meal is derived, then in preferred embodiments the bran is present in the litter in an amount greater than that in which the bran would naturally be present in ground whole grain. Preferably, the bran is present in an amount of at least 5% more than would be present in the ground whole grain; more preferably, the bran is present in an amount of at least 10% more than would be so present. In some embodiments, a litter may comprise one or both of a grain meal or grain germ in combination with a grain bran, the grain bran being a bran from a different grain than the grain from which the meal or germ is derived. More generally, the germ, grain, and cohesiveness agent should be present as discrete ingredients, by which is contemplated that the various components of the litter do not comprise a whole ground grain, or constitute ingredients which when combined and ground are indistinguishable from whole ground grain (although whole ground grain may be a component of the animal litter).

The plant fiber used can include a combination of fibers. In one embodiment, the combination of fibers includes a combination of grain bran and citrus fiber. In this embodiment, the fiber can include a mixture of a grain bran, citrus peels and citrus pulp. When the fiber includes grain bran and a citrus peel/pulp combination, it is preferred that the grain bran is present in an amount of from about 10% to about 20% by weight of the litter, and the combination of citrus peel and citrus pulp is present in an amount of from about 10% to about 20% by weight of the animal litter.

Because the animal litter is made from biodegradable materials, the litter is subject to spoilage, such as by molding or bacterial action. To prevent or inhibit such spoilage, the litter can include a microbial inhibitor. A microbial inhibitor can be present in any amount effective to inhibit or prevent the spoilage of the animal litter. Typically, any ingredient capable of maintaining a pH of the animal litter from about 3 to about 55 is effective to prevent or inhibit spoilage of the animal litter.

In one embodiment, the spoilage inhibitor is a mold inhibitor. Any suitable mold inhibitor can be employed in conjunction with the invention. The mold inhibitor can include, for example, sodium chloride (which can also provide supplemental cohesive properties), propionic acid, propionate salts (e.g., sodium propionate, calcium propionate and the like), citric acid, citric acid salts (e.g., sodium citrate, calcium citrate, potassium citrate and the like), benzoate salts (e.g., sodium benzoate), parabens (e.g., methylparaben, ethylparaben, propylparaben and the like), sorbic acid, and sorbic acid salts (e.g., potassium sorbate and the like), lactic acid and lactic acid salts, acetic acid and acetic acid salts, alginic acid and alginic acid salts, and any combination thereof.

Preferably, the mold inhibitor includes citric acid, sodium chloride, potassium sorbate, or any combination thereof. More preferably, the mold inhibitor includes a combination of citric acid, sodium chloride and potassium sorbate or a combination of citric acid and sodium chloride. When citric acid is used, it is preferably present in an amount of about 0.5% to 2% by weight of the animal litter. When sodium chloride is used, it is preferably present in the animal litter in an amount of about 2% by weight of the animal litter (sodium chloride is believed to function as a supplemental cohesiveness agent when used in this amount). When potassium sorbate is used, it is preferably present in the animal litter in an amount of from 0.1-0.5%, more preferably from 0.1-0.2%, by weight of the animal litter. Other microbial inhibitors may be included if desired, and such ingredients can be present in any amount suitable for their intended purpose.

The animal litter may also include other materials to help in odor absorption and/or elimination. For example, the animal litter may include an odor-absorbing effective amount, such as 2 to 5%, of a carbon-based odor-absorbing material as described in U.S. Application Ser. No. 61/600,966, filed Feb. 20, 2012 and entitled "Odor-Absorbing Materials And Processes For Their Preparation And Use." As disclosed in the '966 application:

It has now been found that spent carbon type products from industrial processes, such as from food processing or water treatment processes, can be used with a limited number of ingredients to form a low density, spent carbon based, odor-absorbing granular product. It also has been found that activated carbon, especially powdered activated carbon, can be usefully employed as an odor-absorbing material in animal litter formulations with improved odor-absorbing capacity and without drawbacks associated with heretofore reported efforts with such material. In some embodiments, this activated carbon material can take the form of spent carbon material from an industrial process.

In some embodiments, spent carbon material is subjected to heat and mechanical work, typically using an extruder, to obtain an odor-absorbing carbon product. A method for preparing an odor-absorbing product thus may comprise the steps of (a) extruding a blend including spent carbon material, a binder, and optionally additional ingredients under conditions sufficient to obtain a cohesive cuttable extrudate; and (c) drying the extrudate to obtain the odor-absorbing product. The odor-absorbing product preferably is an at least partially puffed product to thereby provide a larger odor-absorbing surface area than would be obtained in other granule-forming processes.

In another of its aspects, the present invention relates to a method of processing spent filtration material that comprises activated carbon and, optionally, diatomaceous earth, the method comprising (a) extruding a blend including spent carbon material, optionally, diatomaceous earth, a binder, and optionally, additional ingredients to obtain a cohesive cuttable extrudate; and (b) drying the extrudate to obtain an at least partially puffed odor-absorbing product. The odor-absorbing product preferably is an at least partially puffed (relatively porous) product so carbon particles are exposed over a larger odor-absorbing surface area.

The at least partially puffed odor-absorbing pellet is produced via extrusion at high temperature. When the spent carbon material has been recovered from an industrial process, it is believed that the heat will denature at least in part any unwanted organic materials and will destroy microbiological components. The spent carbon can be extruded with minimal moisture addition to the extruder barrel and with a normal screw configuration. The resulting spent carbon granular pellet exhibits the ability to aid in odor removal where the absence of undesirable odors is preferred.

Since the product is preferably at least partially puffed, and preferably porous, it has a significantly larger working odor-absorbing surface area as compared to solid granulated or agglomerated particles of an odor-absorbing product containing powdered activated carbon. The carbon powder is preferably embedded in and on the surface of the present odor-absorbing product.

The extruded, dried and odor-absorbing product may exhibit a relatively low density, especially in embodiments in which the product is at least partially puffed. The product can be made to exhibit excellent handling during bulk loading and while being processed/handled in various types of equipment.

The product is deemed to find particular applicability in many fields including the field of air filtration, but is deemed particularly useful in the field of animal litters. Advantageously, the converted product can aid in the removal of undesirable odors in congruence with litter bases. This product is suited for in home uses where odors are typically either not removed or slowly removed when using the litter base itself. Advantageously, in other embodiments the product is incorporated in air filtration systems, such as in poultry and hog farms, to remove odors.

Other aspects of the present invention involve enhancing the odor-absorbing characteristics of an existing animal litter through the addition of the present odor-absorbing product.

In aspects of the present invention, an animal litter comprising the present moisture-absorbing addition is obtained. The odor-absorbing product can be incorporated into the animal litter as part of the process of preparing the animal litter from base ingredients, or discrete particles of the odor-absorbing product can be physically blended with discrete particles of a previously prepared animal litter. When added to an existing litter, the particles of odor-absorbing product provide additional capacity to absorb odors and undesirable aromas.

Still another aspect concerns methods for removal of waste, such as animal waste. A container including a litter of the invention is provided, and an animal is allowed to excrete waste into the litter, whereby liquid present in the waste causes agglomeration of at least some of the litter into at least one clump. The clump is then removed from the container. The litter is useful in conjunction with removal of waste from house cats, and also in conjunction with removal of waste from other animals, such as other mammals (e.g. rodents) and birds. It will be appreciated that the animal litter can be prepared from the present odor-absorbing product; the odor-absorbing product can be separately prepared and blended with discrete particles of a previously prepared animal litter and that blend placed in the container (such as a litter box); or the additive can be separately prepared and combined to an existing litter in a container in order.

In general, spent carbon materials contemplated herein contain spent activated or granulated carbon. The spent carbon materials can also contain additional filtration material such as diatomaceous earth. In the latter instance, the spent carbon material contains two major constituents: diatomaceous earth or powdered or activated carbon, in addition to a binder. The spent carbon material can contain about 0% to about 80 wt. % diatomaceous earth and from about 100% to about 20 wt. % powdered or activated carbon.

The spent carbon material can be recovered from a water treatment process or from a food process, as examples. Food processes include starch hydrolysis as well as brewing. For example, the spent carbon material can be recovered from a brewing process or a starch hydrolysis production facility and then re-purposed in a present process instead of being treated as waste requiring disposal. Starch hydrolysis production includes partial or total splitting of the long starch molecules into smaller fragments by chemical or enzymatic processes, purification, concentration and other unit operations for obtaining the desired product (such as a sweetener product). General descriptions of starch hydrolysis are provided in Kearsley et al., Handbook of Starch Hydrolysis Products and Their Derivatives, (1995); Hull, Glucose Syrups Technology and Applications, Wiley Blackwell (2010), the disclosures of which are incorporated herein by reference. For example, in Chapter 3, Hull describes glucose syrup manufacture.

In general the commercial processes and associated equipment are designed with respect to the type of raw material and final product specification. Thus, industrially, starch hydrolysis production may vary somewhat depending on the manufacturer and depending on other factors, such as the starch hydrolysate produced and on the dextrose equivalent (or "DE") value of the product. Starch hydrolysis processes generate waste materials and it has long been desired to provide alternatives to the costs associated with treating and disposing waste materials. In conventional starch hydrolysis, various treatments, including carbon treatments and filtration treatments, are performed to remove undesired organic materials, insoluble materials, colors and the like. The carbon treatments typically require forms of powdered carbon and/or granulated activated carbon, which generate spent carbon material. In starch hydrolysis production certain filtration treatment can be performed using diatomaceous earth. In other processes, including certain starch hydrolysis operations as well as various water purification operations, a filtration step may involve a layer of activated carbon over a layer of diatomaceous earth (as a filtration aid), and both can be re-claimed in combination as spent carbon material. In principle, spent carbon material from a carbon treatment can also be mixed with diatomaceous earth from a filtration treatment and used herein provided it capable of being extruded in accordance with the present invention. Although not preferred, spent carbon can be combined with fresh diatomaceous earth for the purposes of obtaining a spent carbon material for forming a blend from which the moisture absorbent additive can be prepared. And, in principle, fresh activated carbon can be combined with re-purposed diatomaceous earth from a filtration system, such as from starch hydrolysis or a brewing process. The present inventions include methods for forming the product from any of such materials.

Diatomaceous earth is known as diatomite, is a naturally occurring, soft, siliceous sedimentary rock that is easily crumbled into a fine white to off-white powder. It can have a particle size ranging from less than 1 micrometer to more than 1 millimeter, but typically 10 to 200 micrometers. This powder has an abrasive feel, similar to pumice powder and is very light, due to its high porosity. The typical chemical composition of an oven dried diatomaceous earth is 80 to 90% silica, with 2 to 4% alumina (attributed mostly to clay minerals) and 0.5 to 2% iron oxide. Diatomaceous earth consists of fossilized remains of diatoms, a type of hard-shelled algae. Diatomaceous earth itself may be used as a primary ingredient in cat litter formulations for liquid and odor absorption and poses no harm to chemical harm to humans or animals due to its formation in a freshwater source, but by itself does not have the carbon materials (activated carbon or powdered carbon) contemplated by the term spent carbon materials.

In general, the diatomaceous earth component in or combined to form a spent carbon material can be any commercially available diatomaceous earth. Hence, in principle most silica based diatomaceous earths can be utilized. A spent carbon material may include Celatom FW-14 (Celatom) or FW-14 (EP Minerals) brand diatomaceous earth, as an example.

Re-claimed spent carbon materials typically contain significant amounts of moisture. Spent carbon materials from starch hydrolysis and other filtration treatments contain significant amounts of moisture. A moisture content of approximately 25 to 35% is not unexpected.

The density of spent carbon may depend on its moisture content.

By preference, but not as a requirement, the spent carbon material is blended with other materials, particularly a suitable matrix or binder material, which includes a biodegradable material, to ensure the carbon particles are embedded in and on the surface of an at least partially puffed odor-absorbing product prepared in accordance with a method embodiment of the present invention. The matrix or binder material can, if desired, re-purposed from another process to reduce waste disposal cost, again as a green process, provided it is suitable for extrusion and is suitable for preparing an at least partially puffed odor-absorbing product. Certain materials can promote cohesiveness in the odor-absorbing product and are also biodegradable. The binder is preferably such that the extrudate is cuttable. Other ingredients can be added to the blend to be extruded, such as anti-microbial agents, especially when the matrix or binder material is biodegradable.

The binder or matrix material can be, for example, powdered or granular grits or flour, which are biodegradable. Flour includes whole flour as well as de-germinated flour. Flour can include rice flour, corn flour, wheat flour and the like. By preference the flour is de-germinated corn flour or de-germinated ground corn grits. For example, when the matrix or binder material comprises flour (such as de-germinated corn flour or granulated corn grits), it can, in principle, function in part as a cohesiveness agent. Since such substances are biodegradable, ingredients to reduce the prospects for spoliation and other ingredients can be added to the blend before or during extrusion.

The composition (blend) for extrusion contains (on a solids basis) sufficient spent carbon (powdered activated carbon) to provide odor-absorbing capability. Depending on the matrix or binder, sometimes referred to as a substrate, the composition for extrusion can contain upwards of 50% spent carbon, although in principle greater amounts are feasible provided the at least partially odor-absorbing product does not generate unacceptable amounts of carbon dust during packaging, shipping and use.

The blend may be subjected to heat and mechanical work in an extruder to obtain a cohesive and at least partially puffed product. The blend containing spent carbon material can be extruded under conditions, temperatures and pressures to provide an extruded, low density pellet that has the ability to absorb undesirable odors. The product is puffed. The product is dried and is generally considered a low moisture product. A puffed product means the extrudate is at least partially expanded, e.g., a partially puffed.

Preferably, the extrusion back pressure should be sufficient enough to obtain a slightly puffing or expansion effect in combination with shear stress on the ingredients and the effect of moisture flashing off the product at an atmospheric or ambient temperature. The back pressure can be in the range of 500-1000 psi, although in principle other pressures can be employed.

It is preferred that the extrusion be conducted for such time and at temperatures sufficient to remove any unwanted microbiological contaminants in the blend. It is believed that sterilization may be achieved when subjecting a blend for sufficient time to the elevated temperature and pressures in the extruder.

It is presently preferred that, aside from any moisture content of the spent carbon blend, the spent carbon blend is extruded under conditions in which minimal amounts of moisture are added, more preferably in the substantial absence of additional moisture, especially when a spent carbon material has a relatively high initial moisture content, to achieve expansion and loss of moisture consistent with obtaining a product that is moisture-absorbing as well as odor-absorbing. In principle, a minimal amount of water may be added during the extrusion. Moisture from the spent carbon blend and/or from any added water is flashed off. The residual moisture in essence may serve as a blowing agent for the blend as it extrudes through the die(s) of an extruder. This promotes production of an at least partially puffed extrudate. Exemplary addition of moisture is described in the Examples.

It should be appreciated that the extruder is not limited to particular settings or screw configurations. A suitable extruder is a Wenger TX-57 brand twin-screw extruder from Wenger. By preference, the extrusion system includes pre-conditioning capabilities, temperature settings and multiple screw configuration options.

In general, an extruder is provided with an extrusion die(s) and a cutter(s). The extrusion die(s) is selected so the die imparts a desired shape and size to the extrudate. For instance, an opening in a die can have a circular circumference with a suitable diameter. Common die configuration diameters can range from about 1 mm to 5 mm, particularly 2 mm to 4 mm in diameter, and more particularly about 2 mm to 3 mm diameter. The extrudate is cut to a desired size—length by the cutter. The extrudate from the die(s) is cut to the desired size. A pellet having a circular circumference is obtainable. The discrete pellets can be processed further as needed.

It will be appreciated that the extrusion conditions are selected so that an expanded cuttable extrudate is obtained. Preferably the extrudate is cut before drying.

The extrudate is then dried to the desired moisture content. The product has a moisture content that is sufficiently high to prevent the particles from being friable, but preferably sufficiently low enough that the product has capacity to absorb moisture.

The extruded, low density spent carbon additive can be granular but is none-the-less preferably at least partially puffed, and thus porous. The at least partially puffed product has a greater exposed surface area with activated carbon than a comparably sized solid particle because exterior and interior surfaces are exposed due to its expanded structure. In contrast, in a solid granulated particle each layer is successively accreted over a prior layer to form a large granule whereby carbon particles in successive under layers are buried in the process of granulation, and thus the available exposed surface for odor absorption (carbon particles) is undesirably substantially reduced.

By way of exemplification: Fifty pounds of spent carbon containing diatomaceous earth and powdered activated carbon was obtained from starch hydrolysis production (Grain Processing Corporation of Muscatine, Iowa) and was blended with 144 pounds de-germinated ground corn grits from ConAgra, 2 lbs. of citric acid (Tate & Lyle) and 4 lbs. fine grade salt (Cargill Inc.). The blended material was extruded in a twin screw extruder (Model TX-57 brand twin screw extruder, Wenger) using a feed rate of 180 lb/hr with a cylinder speed of 350 RPM and shaft speed at 160 RPM. 3.7 lb/hr steam was forced through cylinder while also feeding 4 lb of water/hr. The extruder was provided with a die containing 17, 3 mm diameter die holes. The extruder was provided with a cutter having thin stainless steel blades and the cutter was set so the blades rotated at 3000 RPM with minimal back pressure. The twin screw extruder contained five separately heated chambers that were each set to specific temperatures to control shear and expansion to adhere all ingredients in blend to one another. The blend was extruded through the die and cut with the cutter to obtain puffed circular pellets sized 3-4 mm and immediately dried using a belt dryer set at 185° F. (85° C.) and a slightly puffed, low density carbon, odor absorbing granular additive with minimal moisture content was obtained. The spent carbon used had a moisture content in the range of 20-50%. The extrudate produced had a loose density of around 25 lbs/cu. Ft.

The litter may be provided with a fragrance-imparting material to provide a pleasant scent. In one aspect, a scent is provided from a natural source, such as but not limited to alfalfa, almond, amber, angelica root, anise, apple, apricot, banana, basil, bay, bay laurel, benzoin, bergamot, bitter orange, black pepper, bois de rose (rosewood), cajeput, cardamom, carrot seed, cedarwood, cedarwood atlas, cinnamon, citronella, citrus, clary sage, clove, cocoa, coconut, coffee, coriander, cranberry, cypress, elemi, eucalyptus globulous, eucalyptus, fennel, frankincense, galbanum geranium, German chamomile, ginger, grapefruit, helichrysum, hyssop, jasmine, juniper berry, lavender, lemon, lemongrass, lily, linden blossom, mango, marjoram, melissa, mint, myrrh, myrtle, neroli, niaouli, nutmeg, orange, oregano, palm, parsley, patchouli, peach, peppermint, petitgrain, pine, pineapple, raspberry, Roman chamomile, rose, rosemary, sandalwood, spearmint, spruce, strawberry, tea, thyme, vanilla, vetiver, violet, yarrow, ylang vlang, and the like. Plant parts that do not provide a scent or have very low scent but that are visually appealing can also be used. The plant parts can be subjected to a process to reduce the size of the parts to a size suitable for addition to an animal litter.

Essential oils or other plant extracts can be used in the litters described herein. Extracts can be physically obtained, such as by pressing or squeezing, or by using solvent, such as oil, organic solvent, or water, to process plant parts. For example, orange oil can be obtained from orange peels, and rose oil can be extracted from rose petals using vegetable or mineral oil. Commercially-available essential oils can also be used, if desired. By one approach, one or more plant extracts or essential oils can be blended to provide a desired scent. For example, a blend of plant extracts can be provided to give a rose, "earthy," "spring," "fresh," "ocean," or other desired scent as can be readily formulated by a skilled person in the art.

In one aspect, the deodorizing agent may include natural or synthetic fragrances. Suitable fragrances include, for example, Modern Lavender, Lavender Fields, Natural Fresh Clean, Baby Fresh Natural, Natural Amber Balsam, Natural Sweet Amber, Natural Fresh Citrus, Natural Fresh Air, and Rose from Fragrance West, Van Nuys, Calif., Baby Fresh, Lilac, Violet, Rose, Jasmine, and Lavender from Bell Flavors & Fragrances, Inc., Northbrook, Ill., Natural Lavender, Rose Geranium, Natural Rosemary Mint, Baby Powder, and Fresh Blossoms Natural from Flavor and Fragrance Specialties, Mahwah, N.J., and Lavender, Jasmine, Amber, and Fresh Wave from Alpha Aromatics, Fox Chapel, Pa.

In some embodiments, the litters provided herein include colorful plant parts, such as flowers, flower buds, petals, or the like, to provide visually appealing colored particles to the litter. In one aspect, the colorful plants parts also provide a natural scent to the litter. In another aspect, the colorful plant parts are provided in combination with a natural based fragrance, such as with a scented oil. For example, brightly colored particles made from dried flowers and petals are often weak in scent and the fragrance of the particles can be enhanced by inclusion of a natural or synthetic fragrance.

The litter may include a blend of essential oil formulated to have lavender scent. For example, "Natural Lavender" fragrance Item#114B13 or 112E13 made by Flavor and Fragrance Specialties, Mahwah, N.J., can be sprayed onto the animal litter at the ratio of 1.6 to 3.5 pounds per ton to provide the litter with a lavender scent.

By another approach, a blend of essential oil formulated to fresh blossom scent, like the "Fresh Blossoms Natural" fragrance item#112B17 made by Flavor and Fragrance Specialties, Mahwah, N.J., can be sprayed onto the animal litter at the ratio of 1.6 to 3.5 pounds per ton to provide the litter with a fresh flower blossom scent.

The litter may include dried lavender flowers and flower buds can be added to the lavender or fresh blossom scented litter at a ratio of 1 to 6.3 pounds per ton of litter. The dried lavender flowers and buds provide a pleasant and sweet scent to the litter while also providing bright colored particles which are appealing to consumers. The flowers provide the impression of a natural fresh scent even though the scent is provided primarily from the essential oil.

In another aspect, dried global amaranth flowers and flower petals can be added to the lavender or fresh blossom scented litter.

By another approach, no scented oils are added to the litters. Instead, dried global amaranth flowers and flower petals are added at a ratio of about 0.88 pounds per ton of litter and lavender flowers and buds are added at a ratio of about 6.3 pounds per ton of litter. The global amaranth flowers and petals have significantly brighter color than the lavender flowers and provide brightly colored particles that are appealing to consumers but are weak in scent. The dried lavender flowers and buds provide an appealing visual appearance and a pleasant and sweet scent to the litter. The colorful amaranth flowers and scent from the lavender flowers provide consumers with the impression of a natural, fresh scent.

In yet another aspect, dried "forget-me-not" flowers, rose petals, purple clover flowers, global amaranth flowers and flower petals, cornflower, cowslip, St. John's wort flowers, yarrow flowers, or field poppy flowers, are added to the litter at a ratio of about 0.88 pounds to 2 pounds per ton of litter. The dried flowers and petals provide brightly colored particles that are appealing to consumers.

By one approach, the scent of the litter can be changed seasonally. For example, the litter can be scented to reflect each of the four seasons of the year. For example, a coffee scent can be prepared from spent coffee grounds. A vanilla scent can be provided from vanilla extract. A coconut scent can be provided from coconut copra pellets. A strawberry or apple scent can be provided by addition of apple or strawberry by-products.

In some cases, the animal litter including plant parts and/or fragrance is packaged under conditions effective to lengthen the shelf life of the scented product. In one aspect, the scented litters can be packaged in a plastic bag with oxygen barrier properties, such as, for example, a laminated polyethylene and polyester or nylon plastic package. In another aspect, the packaging is purged with nitrogen gas to reduce the oxygen level inside the package to less than 10 percent v/v, preferably less than 2 percent v/v. The lower oxygen content would reduce the oxidization of components of the natural fragrance, which was believed to reduce the shelf life of the natural fragrance. Under these conditions, the shelf life of the scented litter is at least about 20 weeks.

The animal litter preferably has a moisture content sufficiently high to prevent the articles of animal litter from becoming friable and sufficiently low to allow additional moisture to be absorbed. Preferably, the moisture content of the inventive animal litter is less than about 30% based on the weight of the litter. More preferably, the moisture content ranges from about 3% to about 25%; even more preferably, the moisture content ranges from about 5% to about 20%; and most preferably the moisture content is from about 5% to about 15%. It is contemplated that some of the moisture in the animal litter will be present originally in the sorbent materials and/or cohesiveness agent. In some embodiments, the moisture content will be about 12% or less In exemplary embodiments, the animal has been found effective in suppressing odors of animal waste such as animal urine. Animal urine contains urea, allantoin, or other compounds which break down to form ammonia. The ammonia odor of spent animal litter is often considered to be objectionable. Animal litters made in accordance with this application will be effective in substantially reducing ammonia odors, and a litter box (housed or exposed) containing such litter will remain substantially free from ammonia odors for about 30 hours or more after the animal has excreted waste into the litter.

In one form, the animal litter preferably has a density sufficient to allow interparticle binding, yet that will minimize the weight of the litter. The litter preferably has a bulk density ranging from about 400-800 kg/m$^3$. Lighter density may have a tendency to make the litter too light and result in "tracking" by an animal, such as a cat. Density preferably is evaluated after loosely filling a container and measuring the weight of a specific volume of the litter.

It will be appreciated that the particle size distribution can have an effect on the functional properties of the animal litter. If there is a relatively high population of very large particles, the litter may absorb liquids more slowly and also may be less effective in masking ammonia odor or other undesirable odors of spent animal litter. On the other hand, a relatively high population of small particles or fines can result in "tracking" and reduced clump strength. In many embodiments, the particle size of the finished litter is such that more than 90% of the particles are larger than a U.S. standard #20 mesh screen size while essentially all of the litter is smaller than a U.S. standard #5 mesh screen size. In some embodiments from 8-15% is larger than a U.S. standard #8 mesh screen size; 55-75% are larger than a U.S. standard #14 mesh screen size but smaller than a U.S. standard #8 mesh screen size, where essentially all of the rest is between a U.S. standard #14 mesh screen size and a U.S. standard #20 mesh screen size. In some embodiments finer particles are not present; in other embodiments, finer particles are present in an amount effective to about 20%; in some cases, up to about 15%; and in some cases, up to about 12%.

Because the animal litter is to be used to absorb animal waste, e.g., urine, the litter should have an absorption capacity sufficient to allow the animal litter to so function. The absorption capacity of the litter preferably is at least about 0.05 ml water per gram of litter, more preferably ranges from about 0.5 to about 1.5 ml/g, and most preferably ranges from about 0.5 to about 1. ml/g. The absorption capacities specified herein are determined per gram of animal litter, based on the absorption of deionized water. Preferred absorption capacity ranges based on the absorption of deionized water are believed to approximate that of animal urine.

Other properties may be desired of an animal litter. For example, to minimize inconvenience and mess associated with packaging, transporting, and using the litter, the litter preferably generates a minimal amount of dust. In one form, the preferred litters do not generate substantial dust, and ordinarily do not require dust reducing agents (although such may be added if desired). Moreover, the preferred litters have a sand-like texture that is not fluffy, which is preferred by domestic animals such as cats.

Another preferred property is clumping efficiency. Clumping efficiency is the amount of litter required to form a dump with a given volume of liquid, with lower amounts of required litter corresponding to higher clumping efficiencies. Preferably, to absorb 30 ml animal urine, less than about 60 g of litter is required; more preferably, less than about 40 g is required.

Other desired properties include biodegradability and tendency to remain clumped over time. Biodegradability is a particularly preferred property when it is desired to dispose of clumps of litter by flushing them into the toilet. The litter is believed to be at least as biodegradable as other grain-based litters, and thus the litter may be disposed of by flushing, even into a septic system. Moreover, the litter exhibits controlled water-absorbing capacity, making it easily flushable down a toilet without excessive expansion. This property can help avoid blockages of drain pipes, e.g., when cat owners flush the soiled litter down the toilet. Tendency to remain clumped refers to the stability of the clump of the soiled litter. A clumping litter should remain clumped for at least 24 hours after the clump has formed. In one form, the litters have an excellent tendency to remain clumped.

A process for preparing an animal litter is also provided. Generally, the process comprises compacting ingredients forming the animal litter into discrete plural particles of a size suitable for use as a litter. In some embodiments, the particle size is accomplished by reducing a larger mass to the desired size. Preferably, the process includes a step of compacting or compressing the particles of animal litter into granules or pellets, which most preferably is accomplished in a pelletizing operation. The stabilizer or mold inhibitor, cohesiveness agent, and/or lubricant, when used, can be added at any suitable stage, and preferably are mixed with the other components of the litter in the desired proportions prior to pelletizing of the grain-based substrate.

When a pellet mill is employed, the moisture content in the pellet mill feed preferably is in the ranges described herein with respect to the moisture content in the finished product, and preferably is 10-14%. Optionally, moisture can be added to the feedstock in the form of liquid water to bring the feedstock to the desired moisture content. The temperature in the pellet mill preferably is brought to about 70-90° C., e.g., 82° C., using steam. The pellet mill may be operated under any conditions that impart sufficient work to the feedstock to provide pellets. It is believed that the particle size of the starting materials, the temperature within the pellet milt and other variables can affect the properties of the final product. The pellet mill can be operated with a suitable die (e.g., a 3/32 in. times 5/32 in. die) at a pressure and temperature effective to provide pellets. The pellets preferably are then crumbled in a pellet mill crumbler to provide discrete plural particles having a particle size capable of passing through an 8 mesh screen but being retained on a 20 mesh screen, or otherwise as described above. As described herein, lubrication is preferably provided by adding a virgin germ. In other embodiments, lubrication may be provided by adding another lubricant, such as a vegetable oil.

A method for removing animal waste is also provided, which method generally contemplates providing a container containing an animal litter described herein, allowing an animal to excrete waste into the container, whereby moisture from the waste causes the animal litter to agglomerate into at least one clump; and removing the clump of litter from the container and preferably any solid waste so as to remove the animal waste. By "container" is meant to include any enclosed or partially enclosed area, such as a litter box, a cage, a stall, a pen (such as a poultry coop), or the like. The method for the removal of animal waste is contemplated to be useful for all animals capable of excreting waste on land, such as cats, dogs, mice, birds, gerbils, reptiles, and other animals, and finds particular applicability in connection with removal of waste from domestic house cats. The method for the removal of animal waste also may be useful for the removal of waste generated by farm animals such as chickens, livestock, or the like.

The following examples further illustrate the invention, but should not be construed as in any way limiting the scope of the invention.

EXAMPLES

Example 1

An animal litter was prepared by mixing the following ingredients and pelletizing using a pellet with a 3/16 inch diameter holes and 2 inch variable thickness die (1 5/8 inch and 2 inch thickness) at a temperature of around 180° F.

| Ingredient | % Total Weight |
| --- | --- |
| Fine Ground Corn Cob | 61.9 |
| Corn Starch (B20F)* | 30 |
| Ground Virgin Corn Germ | 4 |
| Salt | 3 |
| Citric Acid | 1 |
| Potassium Sorbate | 0.1 |

*Corn starch B20F is available from Grain Processing Corporation of Muscatine, Iowa.

The materials were mixed together and then pelletized in a pellet mill with a 5/32 inch die of a 3/16 inch by 2 inch die (1 5/8 inch and 2 inch thickness). The pellet mill was operated at a temperature of about 165-170° F. The product was dried to a moisture content below 12%. The final product was then crumbled to reduce the size of the particles. The finished product had a size distribution as shown in Table 2 below:

TABLE 2

Particle size distribution.

| % Over #8 Sieve | % Over #14 Sieve | % Over #20 sieve | % Over #30 Sieve | % Over #40 Sieve | % Over #80 Sieve | % in pan |
|---|---|---|---|---|---|---|
| 8-15 | 55-75 | 10-20 | <6 | <3 | <2 | <1 |

The litter prepared according to Example 1 was suitable for use as an animal litter.

Example 2

To the litter formulation of Example 1 is added a puffed extruded odor-absorbing material prepared in accordance with U.S. Application Ser. No. 61/600,966. The odor-absorbing material is added in the amount of 2% by weight. The litter is prepared by mixing the ingredients using a small plant size pellet mill with a 3/16 inch diameter holes and a 2 inch variable thickness die (1 5/8 inch and 2 inch thickness) at a temperature of around 180° F.

Example 3

An animal litter was prepared by mixing the following ingredients and pelletizing using a pellet mill with 5/36 inch diameter holes with a 2 inch variable thickness die at a temperature between 160-175° F.

| Ingredient | wt % |
|---|---|
| Ground Citrus Orange peel/pulp Pellets (1/16" screen) | 20 |
| Ground Corn Cobs (through 1/16" screen) | 20 |
| DCM-120* | 41.9 |
| Ground 75:25 blend of DCM-120 and virgin germ | 15 |
| Citric acid | 1 |
| Salt | 2 |
| Potassium Sorbate | 0.1 |

*DCM-120 is defatted corn germ meal.

The litter was found to be a satisfactory cat litter and to have a clump weight of 53 grams, when evaluated by the methods disclosed in WO03/04513482, a PCT publication of Lin Wang and Thomas A. Wiesner, and assigned to Grain Processing Corporation of Muscatine, Iowa.

Example 4

An animal litter was prepared by mixing the following ingredients and pelletizing using a pellet mill with a 3/16 inch×2 inch die size (effective thickness 1 5/8 inch and 2 inch) at a temperature of around 180° F.

| Ingredient | wt % |
|---|---|
| Fine Ground Corn Cob | 59 |
| Corn Starch (B20F) | 30 |
| Ground virgin corn germ | 7.9 |
| Salt | 2 |
| Citric acid | 1 |
| Potassium Sorbate | 0.1 |

The litter was deemed suitable for use as an animal litter.

Example 5

An animal litter was prepared by mixing the following ingredients and pelletizing using a pellet mill with 5/32 inch diameter holes and a 2 inch VR+NVR (variable relief non variable relief) die at a temperature between 160-175° F.

| Ingredient | wt % |
|---|---|
| Fine Ground corn cob | 53 |
| Fine Ground Malt Sprouts | 20.00 |
| Corn Starch | 20.00 |
| Virgin Corn germ | 3.00 |
| Salt | 3.00 |
| Citric acid | 1.00 |

Comparative Example 1

In the same manner as in Example 5, an animal litter was prepared, except that the ingredients were pelletized using a pellet mill with 3/16 inch diameter holes and a 1 inch thickness.

| Ingredient | wt % |
|---|---|
| Fine Ground corn cob | 53 |
| Fine Ground Malt Sprouts | 20.00 |
| Corn Starch | 20.00 |
| Virgin Corn germ | 3.00 |
| Salt | 3.00 |
| Citric acid | 1.00 |

Example 6

The following ingredients ere blended and pelletized using a pelletizer with a 5/32 inch×1/2 inch die.

| Ingredient | wt % |
|---|---|
| Fine ground corn cobs | 43 |
| Fine Ground Malt Sprouts | 25.00 |
| Corn Starch | 25.00 |
| Virgin Corn germ | 3.00 |
| Salt | 3.00 |
| Citric acid | 1.00 |

Comparative Example 2

In the same manner as in Example 6, the following ingredients were pelletized, except that the die size was 3/16 inch×1 inch.

| Ingredient | wt % |
| --- | --- |
| Fine ground corn cobs | 43 |
| Fine Ground Malt Sprouts | 25.00 |
| Corn Starch | 25.00 |
| Virgin Corn germ | 3.00 |
| Salt | 3.00 |
| Citric acid | 1.00 |

The following results were obtained.

| Example | Clump Weight |
| --- | --- |
| Example 5 | 57.9 |
| Comparative Example 1 | Failed |
| Example 6 | 57.7 |
| Comparative Example 2 | Failed |

While it is not intended to limit the invention of a particular theory of operation, it is believed that, in light of the different die geometry of the comparative examples vs. Examples 5 and 6, the animal litter product was "cooked" via pelletizing more than desired, thus leading to a product that did not clump satisfactorily.

Example 7

An animal litter was prepared by mixing the following ingredients and pelletizing using a small pilot plant size pellet mill with 5/32 diameter holes with a ½" thickness die at a temperature between 155-175° F.

| Ingredient | wt % |
| --- | --- |
| Ground Citrus Peel Pellets | 20 |
| Fine Ground Corn Cobs | 20 |
| Ground Corn | 56.85 |
| Citric acid | 1 |
| Salt | 2 |
| Potassium Sorbate | 0.15 |
| Moisture | As-is |

The resulting product was a satisfactory animal litter. When tested, the litter had a clump weight of 60.8 grams and a clump strength of 133.

Example 8

An animal litter was prepared by mixing the following ingredients and pelletizing using a small pilot plant size pellet mill as described in the previous example.

| Ingredient | wt % |
| --- | --- |
| Fine Ground Corn Cobs | 29.85 |
| Ground Corn | 67 |
| Citric acid | 1 |
| Salt | 2 |
| Potassium Sorbate | 0.15 |
| Moisture | As-is |

The litter thus prepared had a clump weight of 63.8 grams.

Example 9

An animal litter was prepared using the processing conditions as described in the previous two examples and using the following ingredients.

| Ingredient | wt % |
| --- | --- |
| Fine Ground Corn Cobs | 20.00 |
| Ground Corn | 76.85 |
| Citric acid | 1 |
| Salt | 2 |
| Potassium Sorbate | 0.15 |
| Moisture | As-is |

The product had a clump weight of 67.3 grams and a clump strength of 224 grams.

Examples 10-14

Animal litters were prepared in accordance with the following examples. Each litter was prepared in a pelletizer.

| Example 10 | |
| --- | --- |
| Ingredient | ratio |
| Ground Corn cobs (through 1/16" screen) | 30 |
| Starch | 12 |
| Ground 75:25 blend of DCM-120 and "virgin" germ | 15 |
| DCM120 | 40 |
| Citric acid | 1 |
| Salt | 2 |
| Potassium Sorbate | 0.15 |
| Moisture | As-is |
| | 100.15 |

| Example 11 | |
| --- | --- |
| Ingredient | ratio |
| Ground Corn cobs (through 1/16" screen) | 25 |
| Starch | 12 |
| Ground 75:25 blend of DCM-120 and "virgin" germ | 15 |
| DCM120 | 45 |
| Citric acid | 1 |
| Salt | 2 |
| Potassium Sorbate | 0.15 |
| Moisture | As-is |
| | 100.15 |

| Example 12 | |
| --- | --- |
| Ingredient | ratio |
| Ground Corn cobs (through 1/16" screen) | 20 |
| Starch | 12 |
| Ground 75:25 blend of DCM-120 and "virgin" germ | 15 |
| DCM120 | 50 |
| Citric acid | 1 |
| Salt | 2 |
| Potassium Sorbate | 0.15 |
| Moisture | As-is |
| | 100.15 |

Example 13

| Ingredient | ratio |
| --- | --- |
| Ground Corn cobs (through 1/16" screen) | 40 |
| Starch | 12 |
| Ground 75:25 blend of DCM-120 and "virgin" germ | 15 |
| DCM120 | 30 |
| Citric acid | 1 |
| Salt | 2 |
| Potassium Sorbate | 0.15 |
| Moisture | As-is |
| | 100.15 |

Example 14

| Ingredient | ratio |
| --- | --- |
| Ground Citrus Orange peel/pulp Pellets (1/16" screen) | 20 |
| Ground Corn cobs (through 1/16" screen) | 20 |
| Starch | 12 |
| DCM-120 | 30 |
| Ground 75:25 blend of DCM-120 and "virgin" germ | 15 |
| Citric acid | 1 |
| Salt | 2 |
| Potassium Sorbate | 0.15 |
| Moisture | As-is |
| | 100.15 |

Each example was prepared generally in accordance with the foregoing teachings by pelletizing the ingredients in the pellet mill. The litters were evaluated and the following results were observed.

| Example | Clump weight (5-min) gram | Ammonia-masking | Comments |
| --- | --- | --- | --- |
| Example 10 | 59 | Slight ammonia | slightly long, but strong clump |
| Example 11 | 58.8 | Good, none to very little ammonia | slightly long, but strong clump |
| Example 12 | 60.2 | No ammonia | Firm, solid clump |
| Example 13 | 54.4 | Slight ammonia | Good clump, slightly long, but strong |
| Example 14 | 56.6 | Good, none to very little ammonia | Good clump, slightly long, but strong |

Example 15

An animal litter product was prepared by mixing the following ingredients and pelletizing using a small pilot plant size pellet mill with a 1/8 inch diameter holes with a 1/2 inch thickness small die at a temperature between 155-475° F.

| Ingredient | ratio |
| --- | --- |
| Ground Citrus Orange peel/pulp Pellets (1/16" screen) | 15 |
| Ground Corn cobs (through 1/16" screen) | 30 |
| DCM-120 | 37 |
| Ground 75:25 blend of DCM-120 and "virgin" germ | 15 |
| Citric acid | 1 |
| Salt | 2 |
| Potassium Sorbate | 0.15 |
| Moisture | As-is |
| Total | 100.15 |

Example 16

An animal litter was prepared in accordance with the same method as the previous example using the following ingredients.

| Ingredient | ratio |
| --- | --- |
| Ground Citrus Orange peel/pulp Pellets (1/16" screen) | 20 |
| Ground Corn cobs (through 1/16" screen) | 25 |
| DCM-120 | 37 |
| Ground 75:25 blend of DCM-120 and "virgin" germ | 15 |
| Citric acid | 1 |
| Salt | 2 |
| Potassium Sorbate | 0.15 |
| Moisture | As-is |
| Total | 100.15 |

Example 17

An animal litter product was prepared by mixing the following ingredients and pelletizing using a small pilot plant size pellet mill with a 3/32 inch diameter holes with a 5/8 inch thickness small die of a temperature between 155-175° F.

| Ingredient | ratio |
| --- | --- |
| Ground Citrus Orange peel/pulp Pellets (1/16" screen) | 15 |
| Ground Corn cobs (through 1/16" screen) | 30 |
| DCM-120 | 37 |
| Ground 75:25 blend of DCM-120 and "virgin" germ | 15 |
| Citric acid | 1 |
| Salt | 2 |
| Potassium Sorbate | 0.15 |
| Moisture | As-is |
| Total | 100.15 |

Example 18

An animal litter product was prepared by mixing the following ingredients and pelletizing using a small pilot plant size pellet mill with a 1/8 inch diameter hole with 1/2 inch thickness die at a temperature between 155-175° F.

| Ingredient | ratio |
| --- | --- |
| Ground Citrus Orange peel/pulp Pellets (1/16" screen) | 20 |
| Ground Corn cobs (through 1/16" screen) | 20 |
| DCM-120 | 42 |
| Ground 75:25 blend of DCM-120 and "virgin" germ | 15 |
| Citric acid | 1 |
| Salt | 2 |
| Potassium Sorbate | 0.15 |
| Moisture | As-is |

The litters of Examples 1548 were evaluated and the following results were observed:

| Example | Clump weight (5-min) gram | Ammonia-masking | Comments |
| --- | --- | --- | --- |
| Example 15 | 55 | OK, Slight ammonia | |
| Example 16 | 56.3 | Excellent, no ammonia | |
| Example 17 | 57.6 | Excellent, no ammonia | |
| Example 18 | 55.4 | Excellent | Nice firm sponge clumps |

Example 19

An animal litter product was prepared by mixing the following ingredients and pelletizing using a small pilot plant size pellet mill with 3/16 inch diameter holes and a 2 inch variable thickness die (1 5/8 inch and 2 inch thicknesses) at a temperature of around 180° F.

| Ingredient | wt % |
| --- | --- |
| Pine sawdust 20-mesh | 25.00 |
| Fine Ground Corn Cob (1/16 screen) | 35.00 |
| Corn Starch (B20F) | 32.00 |
| Ground Virgin Corn Germ | 4.90 |
| Salt | 2.00 |
| Citric Acid | 1.00 |
| Potassium Sorbate | 0.10 |

The litter of Example 19 exhibited an excellent clumping property, with an average clump weight of 52.7 grams, excellent ammonia masking, and tight solid clumps with satisfactory clump strength.

Example 20

An animal litter product was prepared by mixing the following ingredients and pelletizing using a small pilot plant size pellet mill with 3/16 inch diameter holes and a 2 inch variable thickness die (1 5/8 inch and 2 inch thicknesses) at a temperature of around 180° F.

| Ingredient | wt % |
| --- | --- |
| Pine sawdust 20-mesh | 20.00% |
| Fine Ground Corn Cob (1/16 screen) | 42.00% |
| Corn Starch (B20F) | 30.00% |
| Ground Virgin Corn Germ | 3.90% |
| Salt | 3.00% |
| Citric Acid | 1.00% |
| Potassium Sorbate | 0.10% |

The litter exhibited an excellent clumping property, with an average clump weight of 52.5 grams, excellent ammonia masking, and tight solid clumps with satisfactory clump strength.

Example 21

An animal litter product was prepared by mixing the following ingredients and pelletizing using a pellet mill with 3/16 inch diameter holes and a 2 inch variable thickness die (1 5/8 inch and 2 inch thicknesses) at a temperature of around 180° F.

| Ingredient | wt % |
| --- | --- |
| Fine Ground Corn Cob | 64.2% |
| Unmodified Corn Starch | 27.0% |
| Ground virgin corn germ | 5.0% |
| Salt | 3.0% |
| Citric acid | 0.7% |
| Potassium Sorbate | 0.1% |

The product was pelletized and crumbled to the following particle size distribution.

| % Over #8 Sieve | % Over #14 Sieve | % Over #20 sieve | % Over #30 Sieve | % Over #40 Sieve | % Over # 80 Sieve | % in pan |
| --- | --- | --- | --- | --- | --- | --- |
| 8-15 | 55-75 | 10-20 | <6 | <3 | <2 | <1 |

This product had excellent suitability as an animal litter. The following properties were evaluated and determined.

| Clump Weigh (g) Average | Clumping | Clump Strength | Ammonia Masking | Loose Bulk Density | Packed Bulk Density |
| --- | --- | --- | --- | --- | --- |
| 59.6 | Excellent | Solid | Excellent | 32.7 | 35.2 |

It is thus seen that animal litters may be prepared in accordance with the foregoing teachings.

All percentages stated herein other than moisture percentages are specified on a dry solids basis unless otherwise indicated.

All references and previous applications cited are hereby incorporated by reference in their entireties.

Uses of singular terms such as "a," "an," are intended to cover both the singular and the plural, unless otherwise indicated herein or clearly contradicted by context. The terms "comprising," "having," "including," and "containing" are to be construed as open-ended terms. Any description of certain embodiments as "preferred" embodiments, and other recitation of embodiments, features, or ranges as being preferred, or suggestion that such are preferred, is not deemed to be limiting. The invention is deemed to encompass embodiments that are presently deemed to be less preferred and that may be described herein as such. All methods described herein can be performed in any suitable order unless otherwise indicated herein or otherwise clearly contradicted by context. The use of any and all examples, or exemplary language (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims. Neither the marking of the patent number on any product nor the identification of the patent number in connection with any service should be deemed a representation that all embodiments described herein are incorporated into such product or service.

The invention claimed is:

1. An animal litter comprising:
   a sorbent comprising at least about 35 weight % ground corn cob;
   a lubricant; and
   a cohesiveness agent,
   the animal litter being in the form of discrete plural particles which tend to agglomerate when wetted, the cohesiveness agent being present in an amount effective to enhance the intraparticle cohesion of the particles,
   wherein the ground corn cob contributes to the agglomeration of the litter and is in the form of a finely ground corn cob configured to pass through a 1/16 inch screen, and
   wherein no more than about 5% of the ground corn cob is larger than U.S. standard #30 mesh screen size, at least 50% of the ground corn cob is smaller than U.S. standard #40 mesh screen size, and at least 20% of the ground corn cob is smaller than U.S. standard #80 mesh screen size.

2. The animal litter of claim 1 wherein the lubricant is selected from the group consisting of corn germ, virgin corn germ, fats, oils and mixtures thereof.

3. The animal litter of claim 1 wherein the cohesiveness agent is corn starch.

4. The animal litter of claim 1 further comprising a mold inhibitor selected from the group consisting of citric acid, potassium sorbate and mixtures thereof.

5. The animal litter of claim 1 further comprising at least about 10 weight % pine sawdust.

6. A process for preparing an animal litter, the method comprising:
   providing a mixture of a sorbent comprising at least about 35 weight % ground corn cob, a lubricant and a cohesiveness agent; and
   compacting the mixture of into discrete plural compacted particles which tend to agglomerate when wetted,
   wherein the ground corn cob contributes to the agglomeration of the litter and is in the form of a finely ground corn cob configured to pass through a 1/16 inch screen, and
   wherein no more than about 5% of the ground corn cob is larger than U.S. standard #30 mesh screen size, at least 50% of the ground corn cob is smaller than U.S. standard #40 mesh screen size, and at least 20% of the ground corn cob is smaller than U.S. standard #80 mesh screen size.

7. The process of claim 6 wherein the lubricant is selected from the group consisting of corn germ, virgin corn germ, fats, oils and mixtures thereof.

8. The process of claim 6 wherein the cohesiveness agent is corn starch.

9. The process of claim 6 wherein the mixture further comprises a mold inhibitor selected from the group consisting of citric acid, potassium sorbate and mixtures thereof.

10. The process of claim 6 wherein the mixture further comprises at least about 10 weight % pine sawdust.

11. The animal litter of claim 1, further including at least 2% of a puffed odor-absorbing carbon based material.

12. A process according to claim 6, said mixture further including at least 2% of a puffed odor-absorbing carbon based material.

* * * * *